June 29, 1965      D. R. LOCKE      3,191,298

MEANS FOR SECURING CUTTER HEAD UNITS TO A MOUNTING PLATE

Filed March 16, 1962

INVENTOR.
DAVID R. LOCKE

BY C. M. Miranda

ATTORNEY

United States Patent Office 3,191,298
Patented June 29, 1965

3,191,298
MEANS FOR SECURING CUTTER HEAD UNITS TO A MOUNTING PLATE
David R. Locke, Bridgeport, Conn., assignor to Sperry Rand Corporation, New York, N.Y., a corporation of Delaware
Filed Mar. 16, 1962, Ser. No. 180,189
3 Claims. (Cl. 30—43.92)

The present invention relates to improvements in a cutter head assembly for an electric dry shaver.

In electric dry shavers, particularly of the type employing a plurality of cutter head units each having an outer cutter and a reciprocating inner cutter, it is the usual practice to individually attach each of the cutter head units to a single mounting plate to provide a complete cutter head assembly which assembly is then detachably seated in the shaver casing. The individual cutter head units are attached to the mounting plate by either screws, rivets, lugs or similar fastening means. The use of screws to secure the cutter head units to the mounting plate requires tapped openings in the mounting plate and in the cutter head units which results in costly assembly operations. In the case of rivets difficult assembly procedures are involved and do not allow for ready disassembly and ready replacement of the individual cutter head units. A cutter head assembly wherein lugs or tab projections are provided on the individual cutter head units to be set in apertures in the mounting plate and then twisted to secure the cutter head unit to the mounting plate involves the risk of possible deformation of the cutter head.

An object of the present invention is to provide a novel cutter head assembly including novel means for detachably securing a plurality of cutter head units to a mounting plate.

Another object of the present invention is to provide novel resilient means for detachably securing a plurality of individual cutter head units to a mounting plate without the use of screws, rivets or twisted lugs.

Still another object of the present invention is to provide a novel cutter head assembly of relatively few parts to facilitate in the manufacture and in the repair or servicing of the cutter head section of an electric dry shaver.

A still further object of the present invention is to provide novel clamping means to detachably secure a plurality of cutter head units to a mounting plate and which clamping means will not interfere with other structure in an electric dry shaver.

The present invention contemplates a novel cutter head assembly adapted for attachment to an electric dry shaver casing wherein novel clamp means are provided for detachably securing one or more cutter head units to a mounting plate. The clamp means include clamp members arranged at opposite ends of the mounting plate upon one side of which mounting plate the cutter head unit or units are mounted. A first portion of the clamp member slidably engages one side of the mounting plate with finger portions provided on the clamp member to engage and detent the cutter head unit or units to the mounting plate. The invention further contemplates registering recesses formed in the mounting plate and cutter head units adapted to receive intermediate portions of the clamp members to prevent transverse movement of the cutter head units on the mounting plate.

The other and above objects and advantages of the present invention will appear more fully hereinafter from a consideration of the detailed description which follows taken together with the accompanying drawing wherein one embodiment of the invention is illustrated.

In the drawing:
FIG. 1 is a fragmentary partly cross-sectional view of an electric dry shaver taken longitudinally through a cutter head unit of the novel cutter head assembly seated in the shaver casing;

Figure 1:
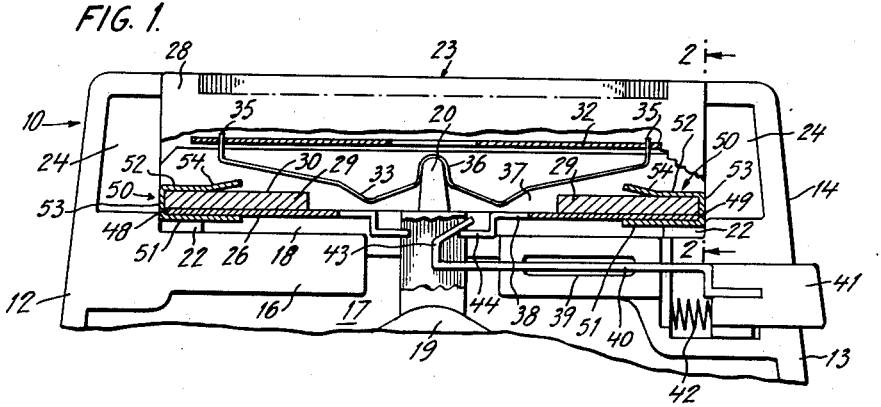
Figure 2:
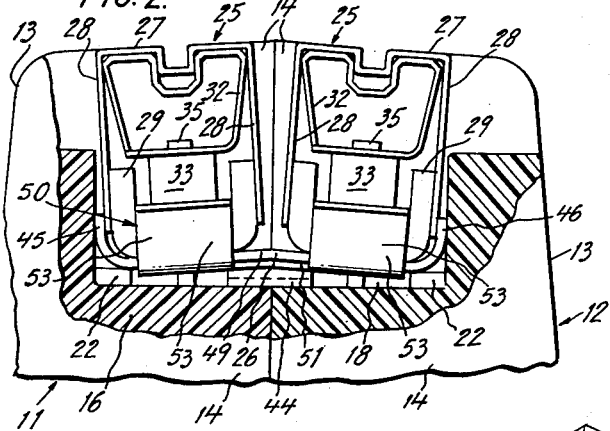
FIG. 2 is an enlarged side view of the cutter head assembly with portions of the casing sections broken away.

Referring now to the drawing for a more detailed description of the present invention an electric dry shaver is generally indicated by the reference numeral 10 in FIG. 1. Electric dry shaver 10 is of a usual type and is made in two opposite casing sections 11 and 12 respectively (partly shown in FIG. 2) and each section is formed oppositely to the other of molded plastic material. Each casing section 11 and 12 has a sidewall 13 together with laterally extending sidewalls 14 projecting in the same direction from sidewall 13. Sidewalls 14 of casing section 11 are constructed so that the edges thereof engage the edges of sidewalls 14 of casing section 12 to provide a closed shaver casing (FIG. 2). Screws (not shown) or other suitable fastening means may be used to secure the two casing sections together in a well known manner.

An upper partition 16 is provided in each casing section to define the top wall of a motor compartment 17 and the lower wall of a cutter head assembly receptacle 18. A shaver motor partly shown and diagrammatically indicated at 19 of any conventional type, as for example a vibratory motor, is mounted in the motor compartment 17 between the sidewalls 13 and 14 of the casing sections 11 and 12. Motor 19 has oscillator arms 20 projecting outwardly therefrom through an aperture 21 in wall 16 into receptacle 18. Cutter head assembly supports 22 are formed at the bottom of receptacle 18 (FIG. 1) on which the lower corners of a novel cutter head assembly 23 are seated. Recesses 24 are provided in the shaver on opposite sides of receptacle 18 to provide hair pockets for receiving cut hair during the operation of the cutter head assembly.

It will be understood by those skilled in the art, however, that the cutter head assembly 23 which is to be hereinafter fully described is not limited to use with the particular shaver casing shown. The drawing has been simplified so as to show only those parts of the shaver casing necessary to illustrate an environment for the novel cutter head assembly 23 which is readily adaptable for use in other types of electric dry shaver casings.

The cutter head assembly 23, as illustrated, includes two individual elongated cutter head units 25 of identical construction which are disposed parallel to each other on a cutter head mounting plate 26. Each individual cutter head unit 25 includes an inverted U-shaped stationary outer cutter 27 having marginal portions of opposite sidewalls 28 thereof each rigidly secured to the arms of a U-shaped base spacer 29, as for example by welding. The base or longitudinal bight portion 30 of each base spacer 29 is provided with a recess 31 in both opposite end edges thereof for purposes to be hereinafter explained. An inner cutter 32 (FIG. 2) is located within each outer cutter 27 and is urged against outer cutter by a leaf spring 33. The inner cutter 32 is of the general type shown in Patent No. 2,793,430 issued May 28, 1957, to L. C. Carissimi. The arms of leaf spring 33 are similar to those in the mentioned patent and are provided with projections 35 at each free end thereof and the projections 35 are fitted in appropriate slots (not shown) in opposite ends of inner cutter 32 to secure leaf spring 33 to inner cutter 32. A looped portion 36 is formed in each leaf spring 33 and is disposed over an opening 37 in the base spacer 29. Base spacer opening 37 is in alignment with an opening 38 in the mounting plate 26 (FIG. 1) and the oscillator arms 20 project through aligned openings 37 and 38 and engage the looped portions 36 of leaf springs 33. As a result the leaf springs are biased towards the outer ends of the inner cutter 32 to urge each inner cutter into cutting cooperation with its outer cutter 27 in a well known manner.

Casing section 12, as shown in FIG. 1 is provided with a guide slot 39 in which is located an intermediate portion of a latch strip 40. One end of latch strip 40 is attached to a spring compressed push button 41 located partly within a casing recess 42 and protrudes partly out of the casing for manual operation. The opposite end of the latch strip 40 is provided with a latch finger 43 which engages the end of a latch projection 44 offset to one side of mounting plate 26. The latch finger 43 is disposed between oscillator arms 20 to engage latch projection 44 on the mounting plate to secure the cutter head assembly 23 in the receptacle 18. In order to release the cutter head assembly 23 from the receptacle 18 the push button 41 is manually pressed inwardly and latch strip 40 slides between oscillator arms 20 (to the left in FIG. 1) and the latch finger 43 disengages from latch projection 44 on mounting plate 26 releasing the cutter head assembly 23 from the receptacle 18.

Figure 4:
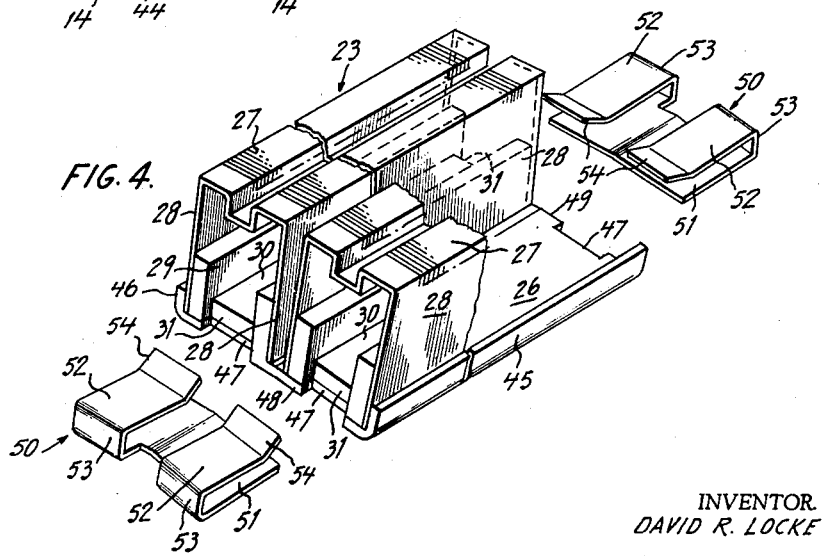
FIG. 4 is a partly exploded perspective view of the cutter head assembly with the inner cutters removed.

Mounting plate 26 of the cutter head assembly 23 is of rectangular configuration (FIG. 4) and in the embodiment of the invention illustrated is slightly convex to present the cutter head units 25 disposed thereon inclined to the horizontal. Longitudinally extending and oppositely disposed flanges 45 and 46 are formed on mounting plate 26 (FIG. 4) and a pair of recesses 47 are cut out at each opposite end edge portion 48 and 49 thereof, respectively. Each mounting plate recess 47 registers with the corresponding recess 31 in base spacer 29 of each cutter head unit disposed on the mounting plate 26. The cutter head units 25 are secured to mounting plate 26 by two detachable U-shaped clamp members 50 (shown to the left and the right in FIG. 1). Each U-shaped clamp 50 is formed of resilient metallic material with one arm of each providing a plate portion 51 conforming in shape to the convex shape of mounting plate 26. The other arm of each clamp 50 includes resilient fingers 52 extending from and bent back and over plate portion 51 (FIG. 4). The base portion of each clamp includes end portions 53 of each finger 52 and detent portions 54 are formed on the opposite end of each finger 52.

Figure 3:
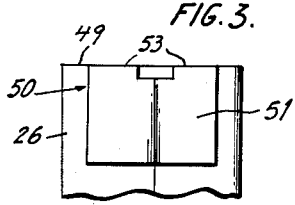
FIG. 3 is a partial bottom view of the right end of the cutter head shown in FIG. 1.

In the disclosed construction after the cutter head units 25 are positioned on the mounting plate 26 in side by side relationship (FIG. 4) between flanges 45 and 46 of the mounting plate, a clamp 50 is snapped into position at opposite ends of the cutter head assembly 23 (to the left and the right in FIGS. 1 and 4). Plate portion 51 of each clamp 50 slidably engages the bottom surface (FIGS. 1 and 3) of mounting plate 26 and each detent 54 engages the bight portion 30 of a base spacer 29. Ends 53 of each finger fit into each pair of registered recesses 47 and 31 of the mounting plate 26 and a base spacer 29 to secure together the mounting plate and spacer and maintain the cutter head units in the spaced positioned relationship on the mounting plate shown in FIG. 2. Fingers 52 cooperate with the clamp plate portion 51 to secure each cutter head unit 25 to the mounting plate and frictionally prevent longitudinal movement of the individual cutter head units 25 thereon. Ends 53 of fingers 52 of each clamp are positioned within the aligned recesses 47 and 31 and do not extend beyond the sidewalls 28 of each outer cutter 27 (FIG. 1) or beyond the side edges 48 and 49 of the mounting plate.

It will be understood by those skilled in the art that the novel cutter head securing means is not limited to a cutter head assembly wherein only two cutter head units are employed. The novel clamping member is readily adaptable to cutter head assemblies wherein only one or more than two cutter head units are secured to a mounting plate of the type described.

It is apparent from the foregoing that the novel cutter head assembly has many advantages in that screws, rivets, twisted lugs or similar fastening means are eliminated from the shaver structure as means to secure the individual cutter head units in position on a mounting plate. This invention results not only in a savings in manufacturing costs and labor and materials but also allows for ready disassembly of a cutter head section of an electric dry shaver for servicing or cleaning. The disclosed structure wherein the contour of the clamp 50 conforms to the contour of the mounting plate allows for a saving in space which is of importance in compact electric dry shavers since the clamp will not interfere with adjacent shaver structure.

What is claimed is:

1. A cutter head assembly for an electric dry shaver, comprising
   (a) a mounting plate having recessed portions at opposite ends thereof,
   (b) a cutter head unit disposed on one side of said mounting plate and having recessed portions at opposite ends thereof registering with said recessed portions of said mounting plate,
   (c) detachable resilient clamp members at opposite ends of said mounting plate,
   (d) a first portion of each of said clamp members slidably engaging the opposite side of said mounting plate,
   (e) a second portion of each of said clamp members slidably engaging and detenting said cutter unit to said mounting plate, and
   (f) an intermediate portion of each of said clamp members disposed in a pair of said registering recesses to prevent transverse movement of said cutter head unit on said mounting plate.

2. A cutter head assembly for an electric dry shaver, comprising
   (a) a mounting plate of rectangular configuration and having recess portions at opposite ends thereof,
   (b) at least two elongated cutter head units each having an inner and an outer cutter,
   (c) said cutter head units disposed parallel and coextensively of each other on one side of said mounting plate,
   (d) a base spacer secured to each of said outer cutters and each base spacer disposed on said one side of said mounting plate,
   (e) said base spacers each having recess portions at opposite ends thereof registering with the said recess portions in said mounting plate,
   (f) a detachable clamp member at each end of said mounting plate,
   (g) said clamp members each having a plate portion slidably engaging the opposite side of said mounting plate,
   (h) fingers on each of said clamp members detenting said base spacers to said mounting plate,
   (i) and end portions of each finger interlocking said registering recesses in said base spacers and mounting plate to prevent transverse movement of said cutter head units on said mounting plate.

3. A cutter head assembly comprising,
   (a) a mounting plate of rectangular configuration and having a plurality of recess portions at opposite ends thereof,
   (b) at least two cutter head units disposed parallel and coextensively of each other on one side of said mounting plate, (c) said cutter head units each having recess portions at opposite ends thereof registering with said recess portions in said mounting plate, (d) detachable resilient clamp members at said opposite ends of said mounting plate, (e) a first portion of each of said clamp members slidably engaging the opposite side of said mounting plate, (f) a plurality of finger portions formed integrally with said first portion of each clamp member with each finger portion slidably engaging and detenting a said cutter head unit to said mounting plate, and (g) intermediate portions of said clamp members formed intermediate said first portion and said finger portions thereof disposed in said pairs of said registering recesses in said mounting plate and cutter head units to prevent transverse movement of said cutter head units on said mounting plate.

References Cited by the Examiner

UNITED STATES PATENTS

| | | | |
|---|---|---|---|
| 2,264,398 | 12/41 | Murphy | 30—41.6 |
| 2,661,531 | 12/53 | Streng | 30—41.6 |
| 2,793,430 | 5/57 | Carissimi | 30—43 |
| 2,844,869 | 7/58 | Kahn | 30—46.2 |
| 2,859,513 | 11/58 | Bylund | 30—46.2 |
| 2,930,119 | 3/60 | Kleinman | 30—43 |
| 3,039,188 | 6/62 | Somers et al. | 30—43 |
| 3,044,168 | 7/62 | Kachline et al. | 30—43 |

FOREIGN PATENTS 206,252   11/39   Switzerland.

WILLIAM FELDMAN, *Primary Examiner.*

EDWARD V. BENHAM, *Examiner.*